(No Model.)
LA MOTTE C. ATWOOD.
OIL FILTER.
No. 390,149. Patented Sept. 25, 1888.
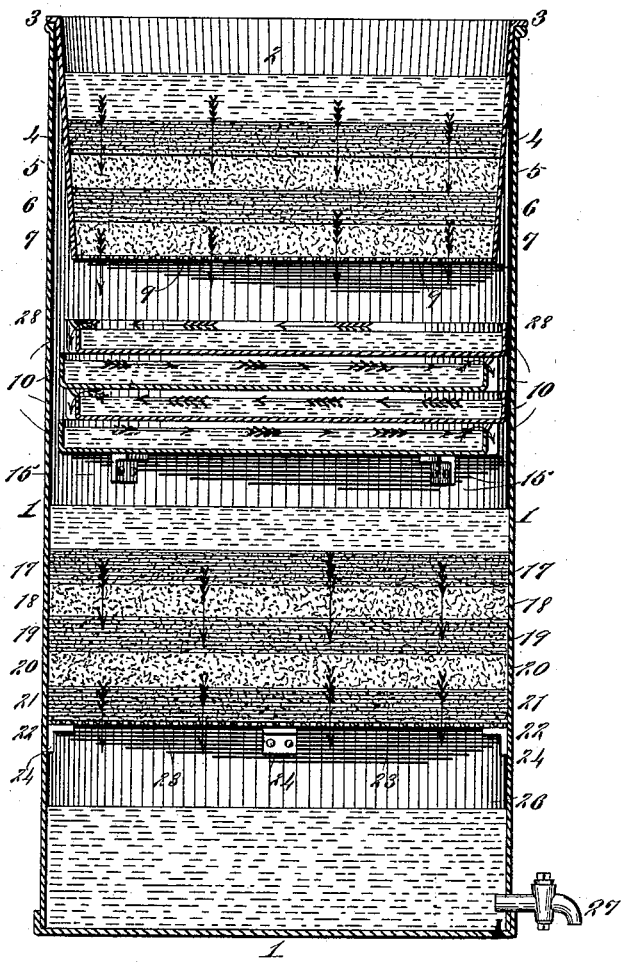
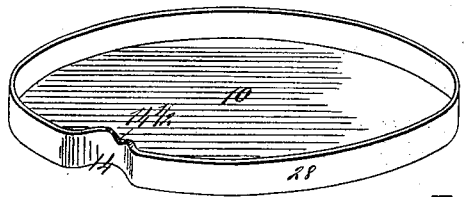
Attest:
Charles Pickles.
Emma Arthur
Inventor:
La Motte C. Atwood.
By Knight Bros.
attys

UNITED STATES PATENT OFFICE.

LA MOTTE C. ATWOOD, OF ST. LOUIS, MISSOURI, ASSIGNOR, BY DIRECT AND MESNE ASSIGNMENTS, TO LEONARD MERRILL, OF SAME PLACE.

OIL-FILTER.

SPECIFICATION forming part of Letters Patent No. 390,149, dated September 25, 1888.

Application filed September 8, 1887. Serial No. 249,152. (No model.)

*To all whom it may concern:*

Be it known that I, LA MOTTE C. ATWOOD, of the city of St. Louis, in the State of Missouri, have invented a certain new and useful Improvement in Oil-Filters, of which the following is a full, clear, and exact description, reference being had to the accompanying drawings, forming part of this specification, and in which—

Figure I is a vertical section of my improved filter. Fig. II is a perspective view of one of the settling-pans.

My invention relates to an improvement in oil filters; and my invention consists in features of novelty hereinafter fully described, and pointed out in the claims.

Referring to the drawings, 1 represents the body or casing, which is preferably made in cylinder form.

2 represents a vessel in which filtering material is placed. This vessel has a flange, 3, extending around its top, which rests on the casing of the filter. The vessel is removable, so that the filtering material may be readily emptied out.

4, 5, 6, and 7 represent layers of filtering material deposited in the vessel 2, which may be of any desired material that will best serve the purpose. The oil is poured on top of the filtering material.

9 represents a number of openings or perforations in the bottom of the vessel 2, through which the oil passes.

10 represents a series of settling-pans, of which there may be any number desired. Each pan is provided with a flange, 28, around the outside, which extends up a short distance, and on which the next pan above it rests.

14 is a depression formed in one side of each pan for facilitating the passage of the oil. (See Fig. II.) These depressions have notches, 14½, through which oil passes to the pan beneath.

15 are brackets on which the bottom pan is supported. After leaving the pans the oil then passes through several successive layers of filtering material, 17, 18, 19, 20, and 21; but I do not confine myself to the number of layers or the kind of material to be used.

22 represents a plate of metal which supports the last-mentioned filtering material, and which has a number of openings, 23, to permit the oil to pass through.

24 represents brackets on which the metal plate 22 rests.

The oil may be drawn off by the faucet 27, as desired.

The operation is as follows: Oil that has been used and which has become mixed with small particles of iron rust, dirt, &c., and which is rendered unfit for further use until purified in some manner, is placed in the vessel at the top, from whence it passes down through the filtering material which the vessel contains and falls onto the top one of the series of pans, and from there passes down to the pan below, and so on through the series. The oil has to pass back and forth in passing from one pan to another, as indicated by arrows, and, the pans being provided with a flange around their periphery, the fine particles of iron, &c., that settle down are retained in the pans. After the oil has passed below the pans it passes through more filtering material and is deposited in the reservoir in the bottom purified and ready to be used over again.

It will be seen that the process may be repeated, the same oil being passed through more than once.

When desired, the filtering material and pans can readily be removed for cleaning.

I claim as my invention—

1. In a filter, the combination, with a casing, of a series of concentrically-arranged settling-pans within said casing, and each of said pans having depressions in its periphery and a notch in its rim, substantially as set forth.

2. In a filter, the combination, with a casing, of a series of concentrically-arranged settling-pans within said casing, and each of said pans having a depression in its periphery and a notch in its rim in said depressed portion, and the said notched depressions being arranged alternately on opposite sides of the series, substantially as set forth.

3. In an oil-filter, the combination of the casing and a settling-pan provided with a flange and having a depression or an indentation in its periphery and also in said flange, and a part of the depressed portion of said flange being cut away, substantially as set forth.

4. In an oil-filter, the combination of the casing 1, vessel 2, having openings 9 and containing filtering material, settling-pans 10, brackets 15, which support the settling-pans, plate 22, having openings 23, filtering material supported by the plate, and brackets 24, substantially as and for the purpose set forth.

In testimony whereof I affix my signature in presence of two witnesses.

LA MOTTE C. ATWOOD.

In presence of—
JAS. E. KNIGHT,
JOS. WAHLE.